Nov. 7, 1972 C. W. SIMONS ET AL 3,702,310

GASKET-FORMING COMPOSITIONS HAVING IMPROVED RESISTANCE TO WATER-BASED AEROSOL PRODUCTS

Filed Jan. 29, 1969 2 Sheets-Sheet 1

INVENTORS.
JOEL A. GRIBENS
CHARLES W. SIMONS
BY
Metro Kalimon
ATTORNEY

AREA WHICH WILL YIELD A VISCOSITY INCREASE OF NOT MORE THAN 1600 CENTIPOISES IN A TWO-MONTH PERIOD (AS MEASURED ON A BROOKFIELD VISCOMETER, MODEL LVF5X, NO. 3 SPINDLE, AT 30 RPM AND 85° ± 2°F.) USING A SODIUM ACETATE CONTENT RANGING BETWEEN 0.5 TO 2.5 PHR.

PHR = PARTS BY WEIGHT PER 100 PARTS BY WEIGHT OF ELASTOMERIC POLYMER.

INVENTORS
JOEL A. GRIBENS
CHARLES W. SIMONS
BY Metro Kalimon
ATTORNEY

United States Patent Office 3,702,310
Patented Nov. 7, 1972

1

3,702,310

GASKET-FORMING COMPOSITIONS HAVING IMPROVED RESISTANCE TO WATER-BASED AEROSOL PRODUCTS

Charles W. Simons, Bedford, and Joel A. Gribens, Framingham, Mass., assignors to W. R. Grace & Co., Cambridge, Mass.

Filed Jan. 29, 1969, Ser. No. 795,107
Int. Cl. G08d *13/28*
U.S. Cl. 252—430 2 Claims

ABSTRACT OF THE DISCLOSURE

Compositions suitable for use as sealing gaskets in aerosol mounting cups composed of a peptized curable neoprene polymer dissolved in a volatile organic solvent which includes a curing system consisting essentially of sodium acetate, magnesium oxide and the 1,3-di-o-tolylguanidine salt of dicatechol borate. The compositions may be modified by the inclusion of ingredients, such as fillers, plasticizers, antioxidants, and pigments to impart desirable properties.

This invention relates to gaskets for sealing closure elements to container bodies. In particular, it relates to composition for preparing gaskets in aerosol mounting cups.

Pressurized aersol containers have found increased use in packaging and dispensing a wide variety of materials. In these packages, the product to be dispensed is confined under pressure by means of a volatile propellant and is discharged in a controlled manner through a valve-actuated orifice. A typical aerosol unit is composed of a hollow cylindrical container closed at one end and provided with an opening at its opposite end for receiving a dispensing valve assembly. A metal mounting cup serves as a closure for the container and also as a support for the valve assembly which is tightly fitted within an aperture centrally located in the cup. The mounting cup carries an annular gasket which is adapted at its outer edge to be rolled and crimped to the walls forming the opening in the container and thereby form a seal upon crimping.

The gasketing material used in aerosol mounting cups should be elastic and resilient so that it yields under deforming forces to establish a satisfactory seal when the cup is crimped to the container and to maintain the seal over normal storage periods. Among the gaskets employed are those of the "flowed-in" type prepared from solvent-based rubber compositions comprising an elastomer dissolved in a volatile organic solvent. These compositions may also contain pigments, fillers, curing agents and other compounding ingredients. Because neoprene (a chlorobutadiene polymer) possesses superior resistance to oxidation, oils, propellants and many chemicals found in aerosol containers, it is most widely used in such composition. Neoprene is dissolved in a suitable solvent, such as toluene, to assist in uniformly depositing the composition in the mounting cup. In preparing gaskets from these compositions, a band of the fluid material is deposited in the channel of the mounting cup while the cup is being rotated beneath a metering nozzle through which the composition flows to form a continuous deposit. Thereafter the deposit in the cup is converted into a dry solid elastomeric sealing mass by expelling the solvent and curing it at elevated temperatures.

While gaskets derived from compositions containing neoprene perform admirably in many aerosol containers, the gaskets are vulnerable to attack when used to seal water-in-oil emulsion packed products, such as insecticidal

2 compositions, window cleaning compositions, simulated snow compositions for decorative purposes and other spray type packages. In such packages the emulsion attacks the neoprene gasket and causes it to degrade. Degradation results in flaking of the gasket which in turn adversely affects the performance of the aerosol unit. For example, the valve may become clogged due to the deposition and accumulation of the flaked solid rubber particles around the valve orifice and in the passageways leading to the orifice. Valve leakage is also a frequent source of trouble due to the flaked particles present in the valve seat which prevents the valve from closing properly and allows the propellant to escape. Another common problem is that the flaked particles settle and either aggravate the valve clogging or they may entirely prevent discharge of the product.

In general, a high degree of resistance to such water-based products can be obtained by increasing the number of crosslinkages between polymer molecules. Crosslinking is effected by curing agents in the presence of cure accelerators. However, the presence of accelerators in the liquid composition can greatly decrease its storage stability resulting from an increase in viscosity. Storage stability is a necessary property which the composition must possess if it is to be properly lined in mounting cups.

Storage stability, or shelf life, is defined as the change in viscosity of the composition which may occur from the time when it is manufactured to the time when it is lined in the channel of an aerosol mounting cup. Generally, the viscosity of freshly-prepared composition ranges between about 1800–2600 centipoises as measured on a Brookfield viscometer, Model LVF5X, No. 3 spindle at 30 r.p.m. and 85°±2° F. Certain neoprene-based compositions become unlinable when stored in containers for periods of two months due to premature curing and increased viscosity which takes place in the container at room temperature. This is particularly apparent if the viscosity of the composition increases about 1600 centipoises from an initial viscosity of about 2600 centipoises. Thus a composition having a viscosity of about 4200 centipoises after a two-month storage period will not meter through conventional nozzle-dispensing apparatus in amounts sufficient (if at all) to form satisfactory sealing gaskets.

According to the present invention, it has now been found that mounting cups can be lined with a curable neoprene-based gasket-forming composition wherein the resulting gasket overcomes the drawbacks of conventional gaskets associated with water-in-oil emulsion packs. The inventive concept resides in the use of a ternary curing system composed of a mixture of magnesium oxide, sodium acetate, and the 1,3-di-o-tolylguanidine salt of dicatechol borate in prescribed amounts. Compositions containing this curing system not only provide resistance against degradation when exposed to water-based aerosol products but they also endow the compositions with desirable storage stability characteristics.

The present invention will be more clearly understood from a reference to the drawing and the discussion relating thereto:

Figure 4:
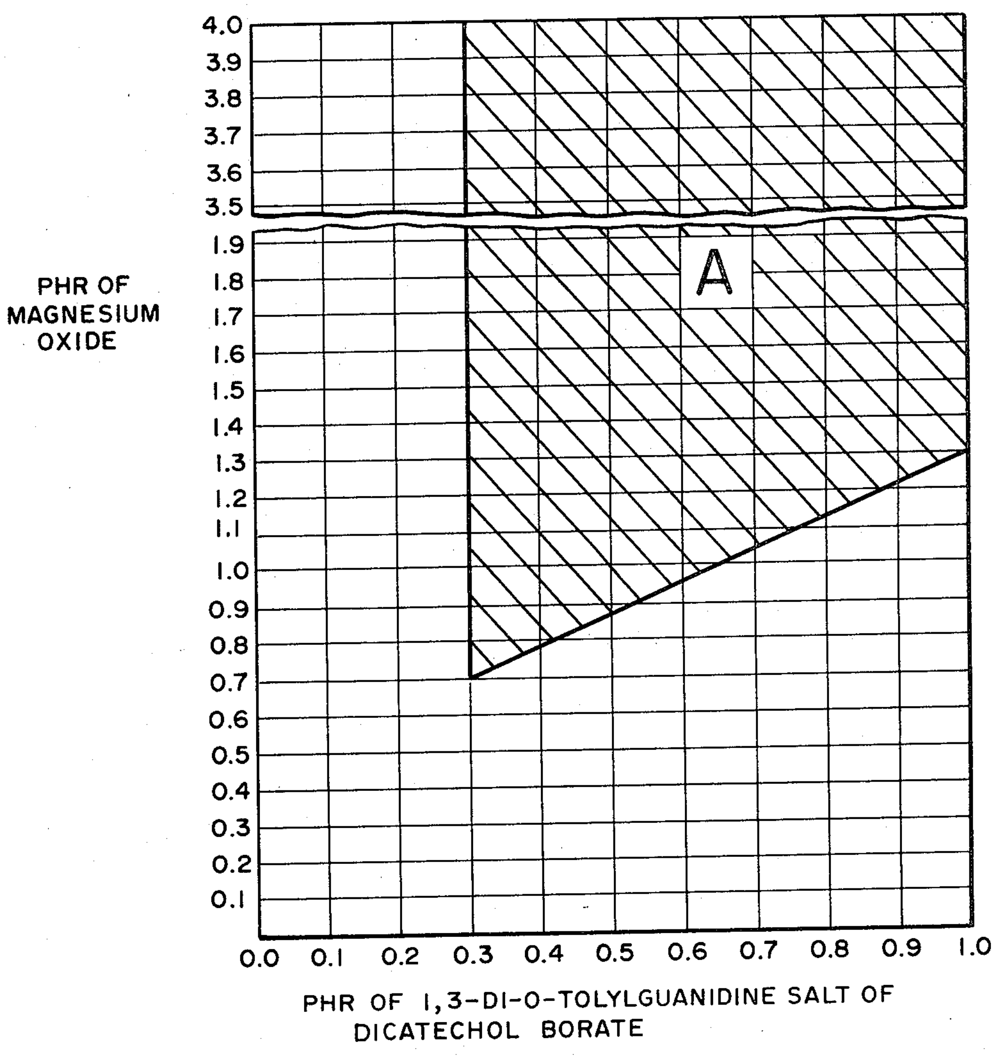

FIG. 4 graphically illustrates the range of proportions of ingredients in the curing system which will yield a viscosity increase of the composition of not more than 1600 centipoises over a two-month storage period.

Figure 1:
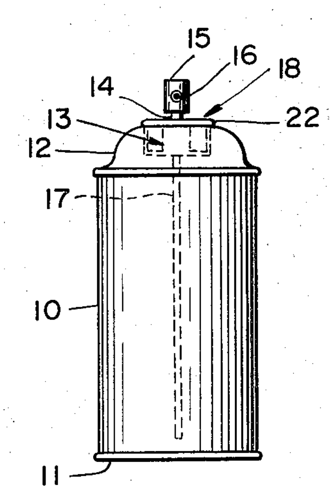
FIG. 1 is a side elevational view of a typical aerosol container provided with a mounting cup and valve unit.

Referring to FIG. 1, a typical aerosol container is illustrated which comprises a cylindrical body portion 10 fitted with a domed top portion 12 and a bottom closure 11. The container is provided with a metering valve generally designated at 13 which is actuated by button 15. The actuator button is carried on a hollow valve stem 14 and is provided with an orifice 16 through which the container contents are discharged when valve 13 is opened. Communicating with valve 13 is a dip tube 17 which is of sufficient length to allow the contents to be discharged from the container. The valve unit, which may be any of the various types known to the art, is supported by a mounting cup, generally designated at 18, which is adapted to receive the valve steam 14. The mounting cup also serves as a closure for the container and carries the sealing gasket in the annular channel 22 which is applied over the opening in the domed top portion 12 of the container.

Figure 2:
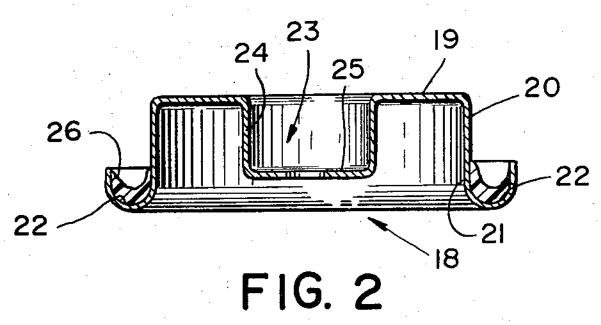
FIG. 2 is an axial sectional view of the aerosol mounting cup of FIG. 1 carrying a gasket prepared from compositions of the present invention.

An axial sectional view of mounting cup 18 is shown in FIG. 2 in inverted position relative to its placement in the assembled container. The cup comprises a circular panel 19 having an integral skirt 20 depending from its periphery. The free edge of skirt 20 is outwardly flanged at 21 to form an annular gasket-receiving channel 22. The inner portion of panel 19 is countersunk to form a tubular recess, generally designated at 23, which has a dependent ciircular wall 24 integrally joined with an apertured horizontal wall 25. When the cup is placed in sealing position, the tubular recess 23 acts as a pedestal for the valve unit and the valve stem is admitted into the container through apertured wall 25. The gasket 26 is disposed predominantly in the annular channel 22 of the cup.

Figure 3:
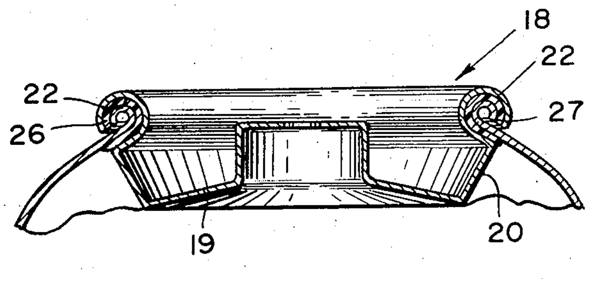
FIG. 3 is a fragmentary axial sectional view of the upper portion of the aerosol container of FIG. 1 showing the gasketed mounting cup of FIG. 2 crimped in position over the mouth of the container.

FIG. 3 shows the gasketed mounting cup of FIG. 2 crimped in position over the mouth of an aerosol container. As illustrated in FIG. 3, the open end of domed portion 12 of the container is provided with an outwardly curled peripheral bead 27 which defines the container mouth. The annular channel 22 of the mounting cup embraces the bead 27 of the container so that the gasket 26 carried by channel 22 is positioned on bead 27. The lower portion of the skirt 20 is flared outwardly against the wall of domed portion 12 adjacent to the bead 27. The gasket forms a seal between the skirt and the wall adjacent to the container mouth.

The water-in-oil aerosol spray offers a method of dispensing active products that are insoluble in the propellant. Typical propellants include halogenated hydrocarbons, such as chlorofluoro lower alkanes of which trichloromonofluoromethane, dichlorodifluoromethane and dichlorotetrafluoroethane are illustrative. By dissolving an active ingredient in water and then emulsifying it into the propellant system, a spray product can be formulated. The propellant forms the "outer" or "oil" phase, and the water and active materials constitute the "inner" or "water" phase. Typical emulsifiers which are useful with chlorofluoro alkanes include polyglycerides of fatty acids, sorbitan monolaurate and polyethylene glycol 400 ditriricinoleate.

The compositions of this invention which form acceptable gaskets for such water-based aerosol products are comprised essentially of a peptized curable elastomeric polymer of 2 - chloro - 1,3 - butadiene dissolved in a volatile organic solvent, and a ternary curing system composed of at least 0.5 part of sodium acetate, at least 0.7 part of magnesium oxide and at least 0.3 part of the 1,3-di-o-tolylguanidine salt of dicatechol borate in which the proportions of the ingredients of the curing system are based on 100 parts by weight of the elastomeric polymer. The curing ingredients must be present in the stated minimum proportions so that the composition will remain stable when stored over prolonged periods and provide gaskets having the desired resistance to water-based aerosol products. Based on a sodium acetate content ranging between 0.5 and 2.5 phr., the magnesium oxide and the borate are present in amounts having the numerical values encompassed within the area designated A in FIG. 4 of the drawing.

The compositions include zinc oxide in which it behaves as an apparent curing agent. It does not become an integral part of the crosslinked bond but catalyzes the reaction in the form of zinc chloride. The zinc chloride is formed by the reaction of the zinc oxide with the hydrogen chloride which is split off from the chloroprene polymer chain.

Magnesium oxide behaves as a cure retarder at mixing temperatures of about 150° F. to 230° F. and occomplishes this function by competing for the available hydrogen chloride. At temperatures of about 250° F. to 350° F. it acts as a curing agent and thus increases the density of crosslinkages. Magnesium oxide is hygroscopic and, therefore, its presence tends to reduce the resistance of the composition to water in water-based emulsion systems. In view of its hygroscopicity in such systems, magnesium oxide should not be used in amounts exceeding 4.0 parts by weight per 100 parts by weight of chloroprene polymer. At least 0.7 part is necessary in order that it may perform the retarding function adequately.

The sodium acetate functions as a cure retarder at mixing temperatures of about 150° F. to 230° F. and as a cure accelerator at curing temperatures of about 250° F. to 350° F. At least 0.5 part of sodium acetate is necessary in order to cure the polymer and amounts above 2.5 impair the storage stability of the composition by thickening it too rapidly. In addition, the water resistance of the resulting gaskets is diminished when amounts above 2.5 are used.

The 1,3,-di-o-tolylguanidine salt of dicatechol borate functions as a cure accelerator. At least 0.3 part is necessary for proper curing and amounts above 1.0 will cause the viscosity of the composition to rise under normal storage conditions whereby the polymer will cure and entrap the other ingredients in the composition. In addition, amounts above 1.0 will reduce the water resistance of the resulting gaskets.

Optimum storage stability of the composition coupled with resistance of the resulting gasket to degradation when used to seal water-based aerosol products are achieved when the ingredients of the curing system are employed in the composition in the following proportions based on 100 parts by weight of elastomeric polymer: 1.5–2.0 parts of sodium acetate; 1.8–3.5 parts of magnesium oxide; and 0.65–1.0 part of the 1,3-di-o-tolylguanidine salt of dicatechol borate.

The sealing compositions of this invention are composed of a polymer of 2-chloro-1,3-butadiene dissolved in a volatile organic liquid having a minimum boiling point of 230° F. The polymer may be homopolymerized chlorobutadiene or chlorobutadiene copolymerized with minor amounts of styrene, acrylonitrile, isoprene or other monomer copolymerizable therewith. The polymer may be dissolved in a single volatile organic liquid which solvates the polymer or a mixture of such liquids which together function as a solvent for the polymer. The organic liquids must be readily volatilizable from the composition during the overall drying and curing cycle. Illustrative volatile liquids include toluene, xylene, a high boiling petroleum solvent, such as "Solvesso 100" which has a boiling point ranging between about 230° F. and 345° F., and an aliphatic petroleum solvent, such as "Varsol #1" which boils in the range between about 320° F. and 390° F., and mixtures of such solvents.

The compositions may include a non-volatile liquid plasticizer in amounts ranging between about 0 and 200 parts by weight per 100 parts by weight of polymer. Though their use is not essential, plasticizers facilitate mixing of the polymer with other ingredients, such as fillers, and also enhance the sealing characteristics of the resulting gasket. When added in amounts of about 200 parts, the plasticizer has a tendency to exude from the cured composition. Preferably, the plasticizer is used in amounts between about 40 and 100 parts by weight to give gaskets having the requisite degree of hardness to insure satisfactory sealing. Illustrative plasticizers include dioctyl sebacate, dioctyl adipate, didecyl phthalate, dioctyl phthalate, naphthenic oils or any relatively non-volatile liquid plasticizing material used as processing aids for neoprene rubber.

While the presence of inorganic fillers is not essential in these compositions, their use in sealing aerosol containers tends to reduce the permeability of the gasket to propellants. The fillers are also helpful in modifying the specific gravity and flow characteristics of the fluid composition. Suitable fillers include hydrated calcium silicate, fine sized whiting, talc, silicon dioxide and clays. The quantity of filler may range between about 0 and 300 parts by weight based on 100 parts by weight of polymer. Above about 300 parts, the gasket becomes too hard and lacks the resilience and elasticity which is desired for sealing purposes. Generally, amounts ranging between about 80 and 200 parts by weight are preferred, though the exact quantity used will depend upon the selected filler or combination of fillers and the characteristics they impart to the fluid composition and the properties they impart to the cured gasket.

It is also preferred to use a peptizer for the polymer particularly where the total solids concentration is above about 50% by weight. Peptizers allow greater ease in adjusting the viscosity of the composition to a value within the range required for standard lining equipment. Typical peptizers include alkyl thiuram disulfides, e.g., tetramethyl and tetraethyl thiuram disulfides; piperidinium alkyl dithiocarbamates, e.g., piperidinium pentamethylene dithiocarbamate; and guanidines, e.g., di-o-tolylguanidine. Peptizers are used in amounts between about 0.5 and 6 parts by weight based on 100 parts by weight of polymer.

Other ingredients may be incorporated into the composition to impart desirable properties. These include lubricants, e.g., stearic acid and petroleum waxes; antioxidants, e.g., diphenyl-p-phenylenediamine and p-(p-tolylsulfonylamido) diphenylamine; and pigments, e.g., carbon black, iron oxide and titanium dioxide. When lubricants, antioxidants, pigments and other ingredients are employed, they are used in conventional amounts to achieve the desired effect.

The volatile organic liquid is used in amounts that will give compositions having a total solids concentration between about 40 and 75% by weight, and preferably between about 50 and 65% by weight. The total solids portion of the compositions includes the combined weight of polymer, fillers, curing mixture and the other substantially non-volatile ingredients employed. Below about 50% total solids it is difficult to obtain the thick gaskets required for aerosol mounting cups in a single pass through closure lining machinery. Above about 65% the compositions become quite thick and it is difficult to maintain the viscosity in a range that can be lined on conventional automatic lining machinery.

The invention is further illustrated by the following example which represents a typical formulation of the composition having the desirable cure and storage stability as well as resistance to degradation of the resulting gaskets when exposed to water-based aerosol products. All quantities are reported in parts by weight unless otherwise stated.

EXAMPLE

| Ingredient: | Parts |
|---|---|
| Poly-(2-chloro-1,3-butadiene) | 100 |
| Paraffin wax, M.P. 117° F. | 2 |
| Buca clay | 140 |

| | |
|---|---|
| Tetraethylthiuram disulfide | 2.5 |
| Piperidinium pentamethylene dithiocarbamate | 2.0 |
| Dioctyl phthalate | 76 |
| Zinc oxide | 6.25 |
| Mixture of 4-octyl diphenylamine and 4,4'-dioctyl diphenylamine (AgeRite Stalite) | 2 |
| 2-mercaptoimidazoline | 0.4 |
| Silicon dioxide | 0.133 |
| Zinc resinate | 0.5 |
| Curing system: | |
| Sodium acetate | 1.8 |
| Magnesium oxide | 3.0 |
| 1,3-di-o-tolylguanidine salt of dicatechol borate | 1.0 |

Toluene—added in amount sufficient to give a total solids content of 62% by weight in the final composition.

The composition was prepared by first milling the polymer for about one minute in a Banbury Mixer. The sodium acetate, paraffin wax, about 57% by weight of clay, about 9 parts by weight of dioctyl phthalate, and a blend composed of the magnesium oxide, about 33% by weight of zinc resinate and about 6 parts by weight dioctyl phthalate were slowly added to and mixed with the polymer for about six minutes. The batch was transferred to a Sigma mixer and the remaining amount of clay, the tetraethylthiuram disulfide and piperidinium pentamethylene dithiocarbamate were then added and the batch was masticated for about one hour. About 50 parts by weight of dioctyl phthalate and 290 parts by weight of toluene were then slowly added and mixed for about two hours. A second blend composed of 2-mercaptoimidazoline, the 1,3-di-o-tolylguanidine salt of dicatechol borate, zinc oxide, silicon dioxide and the remaining portions of zinc resinate and dioctyl phthalate were added and the entire batch was mixed for about 20 minutes while maintaining the temperature of the batch below 110° F. Some volatilization of toluene occurred during processing so that the total solids content of the final composition was about 62% by weight. The viscosity of the freshly-prepared composition was about 2000 centipoises as measured on a Brookfield viscometer, model LVF5X, No. 3 spindle at 30 r.p.m. and 85°±2° F. The viscosity of a representative portion of the composition after storage for a two-month period was 2500 centipoises. Thus, the viscosity of the composition increased only 500 centipoises over this storage period.

A representative portion of the stored composition was used to line a number of standard aerosol mounting cups to form sealing gaskets. The cups had an outside skirt diameter closely approaching one inch which are used to seal metal aerosol containers having a filling opening, the inside diameter of which measures 1.000±0.004 inch. The cups were lined by depositing the composition through a nozzle in the channel of the cup which was seated on a rotary chuck on standard automatic lining machinery. Lining was carried out at a rate of 150–200 cups per minute. The quantity of composition deposited in each cup averaged about 500 milligrams wet weight which is equivalent to a dry weight of 310 milligrams.

The lined cups were dried and cured according to the following schedule:

| Time (hr.): | Temperature |
|---|---|
| 1 | (1) |
| 1 | ° F. 155 |
| 1 | ° F. 200 |
| 1 | ° F. 325 |

[1] Air dried at ambient temperature.

The mounting cups containing the cured gasket were tested for degradation of the gasket in the presence of a water-in-oil emulsion. The testing emulsion had the following composition:

| Ingredients: | Parts by weight |
|---|---|
| Naphtha (odorless mineral spirits), B.P. 244–291° F. | 7 |
| Water | 52 |
| Toluene | 3 |
| Polyglycerol ester of a fatty acid (Emcol 14) | 1 |

The tests were carried out by immersing the gasketed cups in the above emulsion for 100 hours at room temperature. When the immersion cycle was completed, the cups were removed, dried and the gaskets were visually inspected. Inspection showed that the gaskets suffered no or very little degradation when exposed to these conditions. The test is considered severe because the entire gasket is immersed in the emulsion whereas when the gasketed cup is mounted in sealed relationship with an aerosol unit containing a water-in-oil emulsion only a slight portion of the gasket is exposed to the contained emulsion. Moreover, the test emulsion is quite harsh having a high solvent action and is characteristic of the type of emulsions used in aerosol spray compositions for cleaning ovens.

The formulation of the composition of the example was modified by varying the amounts of the ingredients of the curing system to ascertain the effect on the storage stability of a series of compositions and the degradative effect of the resulting gaskets in the presence of a water-in-oil emulsion. Other than the variance in the proportions of the ingredients of the curing system, the proportions of the other ingredients in the composition of the example were the same. The curing systems tested had the following range of proportions of the ingredients:

| Ingredient | Range of proportions (phr.) |
|---|---|
| Magnesium oxide | 0.5 to 4.0 |
| Sodium acetate | 0 to 2.5 |
| 1,3-di-o-tolylguanidine salt of dicatechol borate | 0.3 to 1.0 |

The initial viscosity of the compositions was about 2000 centipoises. The viscosity of the composition having no sodium acetate present rose about 128,000 centipoises over a two-month storage period which rendered the composition unsuitable for lining aerosol mounting cups. The addition of 0.5 phr. of sodium acetate to a composition containing 0.5 phr. magnesium and 0.3 phr. of the borate reduced the viscosity increase to about 6400 centipoises over the same storage period but was still unlinable. Further tests showed that in order to prevent the viscosity of the composition from rising not more than 1600 centipoises over its initial viscosity when the composition was stored for two months, the minimum proportions of the ingredients in the curing system must be at least 0.7 phr. magnesium oxide, 0.5 phr. sodium acetate and 0.3 phr. of the borate.

The effective amounts of the ingredients in the curing system respecting storage stability of the composition are shown in FIG. 4 of the drawing where the proportions of the magnesium oxide and the borate range between 0.7 to 4.0 and 0.3 and 1.0 phr. respectively based on a sodium acetate content of 0.5 to 2.5. The curing systems which are suitable in these compositions based on a sodium acetate content of 0.5 to 2.5 phr. contain proportions of magnesium oxide and borate having the numerical values embraced within the area designated A in FIG. 4. It is noted that as the proportion of the borate is increased there is a corresponding increase in the magnesium oxide content. While magnesium oxide may be used in amounts above 4.0 phr. without adversely affecting the storage characteristics of the composition, amounts of this ingredient exceeding 4.0 phr. have a tendency to degrade the resulting gasket in the presence of water-in-oil aerosol packs due to its hygroscopic nature. Amounts of the borate exceeding 1.0 phr. will cause the viscosity of the composition to rise under normal storage conditions and will impair the water resistance of the gaskets and similar effects transpire when the sodium acetate content is present in amounts about 2.5 phr.

The present invention provides a ternary curing system suitable for curing gasket-forming compositions containing an elastomeric polymer. The curing component endows the compositions with a balance of properties which permits the composition to remain stored over a given period of time while retaining its stability and yields gaskets which have excellent resistance to water-in-oil emulsion packs.

We claim:

1. A ternary system for curing an elastomeric polymer consisting essentially of 0.5 to 2.5 parts by weight of sodium acetate, magnesium oxide and the 1,3-di-o-tolylguanidine salt of dicatechol borate, said oxide and borate having the numerical values embraced within the area designated A in FIG. 4 of the drawing.

2. A system according to claim 1 which is composed of 1.5 to 2.0 parts by weight of sodium acetate, 1.8 to 3.5 parts by weight of magnesium oxide, and 0.65 to 1.0 part by weight of the 1,3-di-o-tolylguanidine salt of dicatechol borate.

References Cited

UNITED STATES PATENTS

| | | | |
|---|---|---|---|
| 2,670,342 | 2/1954 | Verranc | 260—92.3 |
| 3,036,983 | 5/1962 | O'Connor | 252—430 UX |

PATRICK P, GARVIN, Primary Examiner

U.S. Cl. X.R.

260—31.8, 33.6, 41.5, 92.3